United States Patent [19]

Allport et al.

[11] 4,160,179

[45] Jul. 3, 1979

[54] RECTIFIER AND BRUSH ASSEMBLY FOR AN ALTERNATOR

[75] Inventors: Maurice J. Allport, Stourbridge; Herbert J. T. Cotton, Hollywood, both of England

[73] Assignee: Lucas Industries Limited, Birmingham, England

[21] Appl. No.: 843,242

[22] Filed: Oct. 18, 1977

[30] Foreign Application Priority Data

Oct. 23, 1976 [GB] United Kingdom ............... 44096/76

[51] Int. Cl.² ............................................. H02K 11/00
[52] U.S. Cl. ................................ 310/68 R; 310/68 D; 310/239
[58] Field of Search .................... 310/68 R, 68 D, 239

[56] References Cited

U.S. PATENT DOCUMENTS

| 3,538,362 | 11/1970 | Cheetham et al. | ................. 310/68 D |
| 3,586,892 | 6/1971 | Sato | ................................ 310/239 X |

Primary Examiner—Donovan F. Duggan
Attorney, Agent, or Firm—Trexler, Wolters, Bushnell & Fosse, Ltd.

[57] ABSTRACT

A rectifier and brush assembly for an alternator has a rectifier comprising two parallel spaced phase plates carrying respective sets of diodes. The terminals of respective diodes of the sets are soldered to respective connectors. One terminal of each of a set of field diodes is also soldered to each connector while the other terminal of each field diode is soldered to a connector common to all the field diodes. This common connector has an integral apertured flange which is secured by a screw against a conductive plate carried by a housing for the brushes. The conductive plate is electrically connected with one of the brushes in the brush housing. The brush housing also carries a voltage regulator of which a lead is crimped to an apertured electrical connector secured by the screw to the conductive plate.

4 Claims, 4 Drawing Figures

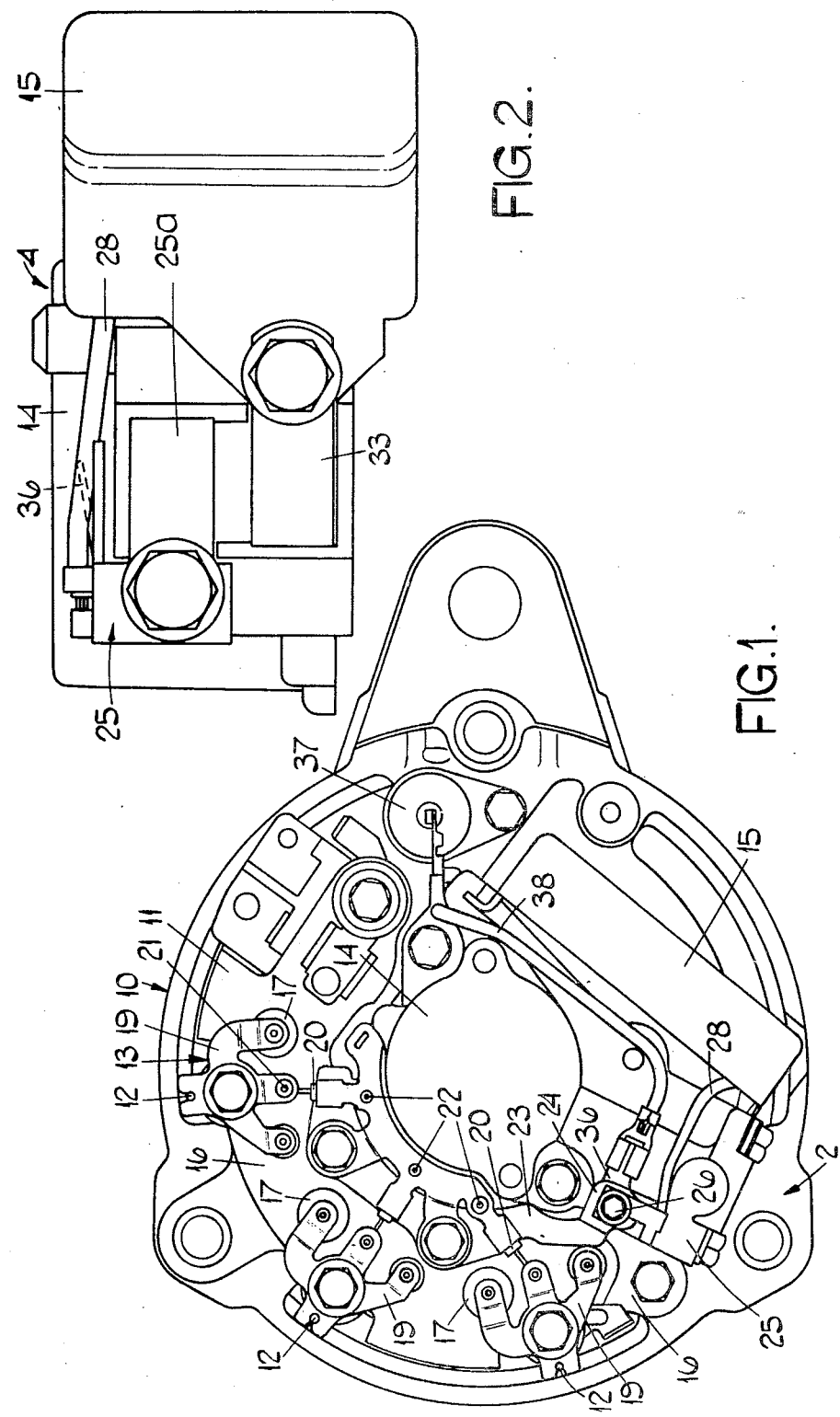

RECTIFIER AND BRUSH ASSEMBLY FOR AN ALTERNATOR

This invention relates to a rectifier and brush assembly for an alternator and to an alternator including such an assembly.

According to one aspect of the present invention, there is provided a rectifier and brush assembly for an alternator, in which assembly field diodes in the rectifier have terminals interconnected by a common electrical connector which has an integral apertured flange secured by a fixing screw which passes through an electrically conductive member mounted on a electrically insulating brush housing, said electrically conductive member being electrically connected with one of the brushes.

Preferably, said electrically conductive member is in the form of a relatively rigid plate which has a portion serving as an abutment for a spring biasing said one of said brushes.

According to another aspect of the present invention, there is provided an alternator including a rectifier and brush assembly as defined in any one of the last two preceding paragraphs.

Figure 3:
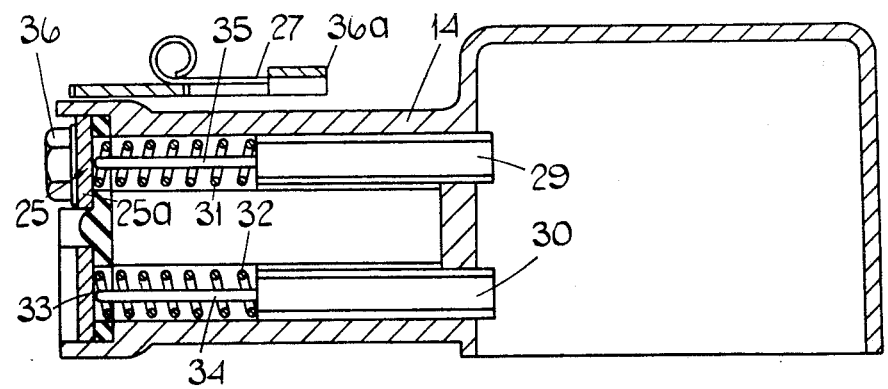
Figure 4:
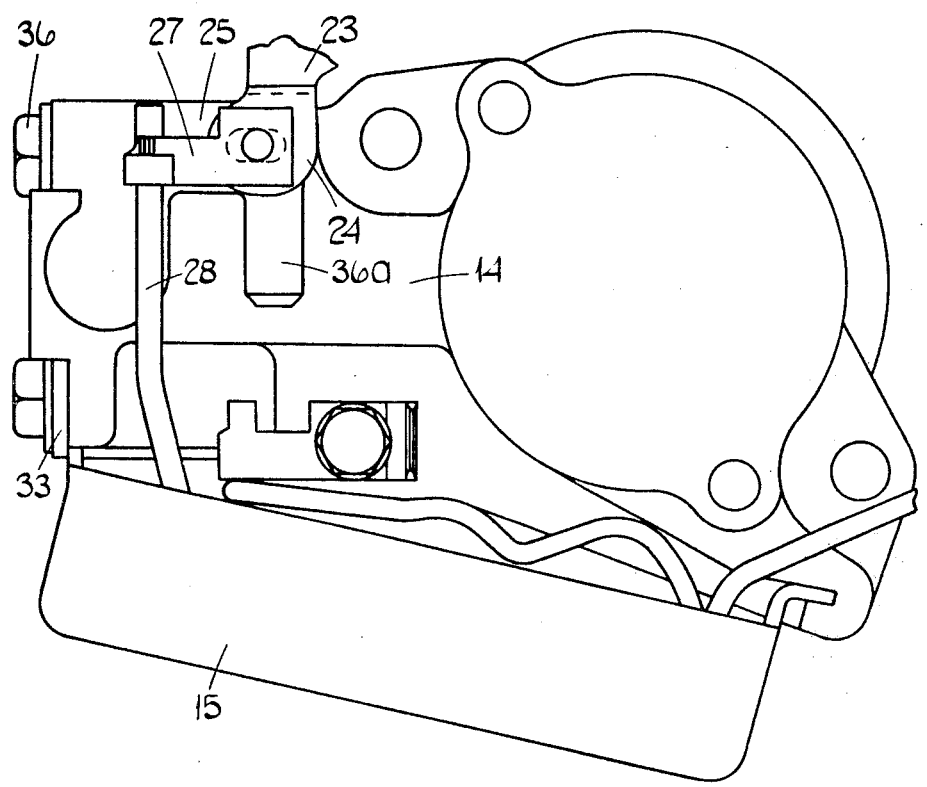

An embodiment of the present invention will now be described by way of example, with reference to the accompanying drawings, in which:

FIG. 1 is an end view of an alternator including one example of a rectifier and brush assembly according to the present invention, FIG. 2 is a view in the direction of arrow II of part of the rectifier and brush assembly illustrated in FIG. 1, FIG. 3 is a longitudinal sectional view of a brush housing forming part of the rectifier and brush assembly illustrated in FIG. 1, FIG. 4 is a plan view in the direction of arrow IV in FIG. 2 and additionally showing a flange of the rectifier.

Referring first to FIG. 1, the alternator comprises a housing 10 including an integral end bracket 11 housing a rotor (not shown) and a stator (also not shown) having terminals 12 projecting through the end bracket 11. Mounted on the end bracket 11 externally of the housing 10 are a rectifier 13 and an electrically insulating brush housing 14. A voltage regulator 15 is mounted on the brush housing 14.

The rectifier 13 has first and second phase plates 16 mounted in stacked relationship on the end bracket 11. First and second sets of diodes 17 (only the diodes 17 associated with the second or uppermost phase plates 16 are shown). Terminals 18 of the first and second sets of diodes 17 are electrically interconnected by configurated metal plate connectors 19. The terminals 12 of the stator of the alternator are soldered to respective connectors 19. The rectifier 13 also includes a set of field diodes 20. Each field diode 20 has a terminal 21 connected with a respective one of the connectors 19 and a terminal 22 which is connected with a common electrical connector plate 23 so that the terminals 22 are electrically interconnected. Most preferably, the field diodes and common connector for the terminals 22 are of the type described in our co-pending United States Patent application Ser. No. 843,732 entitled "Multiphase fullwave rectifier assembly". The connector plate 23 has an integral, apertured flange 24 which overlies a relatively rigid electrically conductive plate 25 mounted on the brush housing 14. A screw 26 (see FIG. 1) passes through apertures in the flange 24 and the plate 25 to engage in a bore in the brush housing 14 so as to secure the flange 24 against the plate 25. The screw 26 also serves to secure a connector 27 in electrical contact with the flange 24, said connector 27 having crimped thereto a lead 28 from the voltage regulator 15.

The brush housing 14 houses a pair of brushes 29 and 30 which are biased by respective springs 31 and 32. The brush 30 is connected with a plate 33 by means of a flexible electrical conductor 34. The plate 33 is connected with the voltage regulator 15 in a manner which will not be described in any further detail herein. The preferred manner of connection of the plate 33 with the voltage regulator 15 is as described in our co-pending United States Patent application Ser. No. 843,243, entitled "A Voltage Regulator and Brush Assembly". The brush 29 is electrically connected with a portion 25a of the plate 25 by means of a flexible conductor 35. The portion 25a of the plate 25 provide an abutment for the spring 31 and a screw 36 engaging in the brush housing 14 serves, as well as the screw 26, to mount the plate 25 on the brush housing 14. The plate 25 further includes an integral terminal 36 which is connected with a surge protection diode 37 via a lead 38 (see FIG. 1).

Thus, the connector plate 23, which includes the apertured flange 24, is directly secured to the plate 25 mounted on the brush housing 14. It is this plate 25 which has the portion 25a serving to provide the electrical connection with the brush 29. The portion 25a of the plate 25 also serves as an abutment for the spring 31. This arrangement reduces the overall number of connections to be made between the rectifier and the brush compared with the case where a separate electrical connector interconnecting the connector plate 23 and the plate 25 is provided. This reduces costs by reducing the overall number of parts required and by reducing the amount of labour involved in assembly as well as ensuring a good electrical connection between the rectifier 13 and the brush 29.

We claim:

1. A rectifier and brush assembly for an alternator comprising, a rectifier having a plurality of field diodes, said field diodes having a corresponding plurality of terminals, a common electrical connector interconnecting said terminals and having an integral apertured flange, an electrically insulating brush housing contacting alternator brushes, an electrically conductive member mounted on said electrically insulating brush housing, a fixing screw securing said apertured flange to said electrically conductive members, and a biasing spring for biasing one of said alternator brushes, said electrically conductive member being electrically connected with one of said brushes and in the form of a relatively rigid detachable plate having a portion forming an abutment for said spring biasing said one of said brushes.

2. An assembly as claimed in claim 1 further comprising a connector and a voltage regulator mounting on said brush housing wherein said fixing screw also secures said connector in electrical connection with the electrically conductive member, and wherein said connector has a lead secured thereto extending from said voltage regulator mounting on said brush housing.

3. An assembly as claimed in claim 1 further comprising a surge protection diode and wherein said electrically conductive member includes an integral terminal which is electrically connected with said surge protection diode.

4. A rectifier and brush assembly for an alternator comprising: rectifier means including a plurality of field diodes, each said field diode having at least on terminal; a common electrical connector interconnecting said field diode terminals and having an integral apertured flange; an insulated brush housing including at least one brush means; a biasing spring within said brush housing for biasing said brush means; and a removable conductive abutment means electrically connected to said brush means and releasably secured to said apertured flange and said insulated brush housing for providing an abutment for said biasing spring and being removable from said brush housing for facilitating removal and replacement of said brush means externally to said brush housing.

* * * * *